Jan. 28, 1964    J. H. BROWN    3,119,422
BARK REMOVING MACHINE
Filed July 18, 1961    2 Sheets-Sheet 1

INVENTOR:
JESSIE H. BROWN

BY Eaton, Bell, Hunt & Seltzer
ATTORNEYS

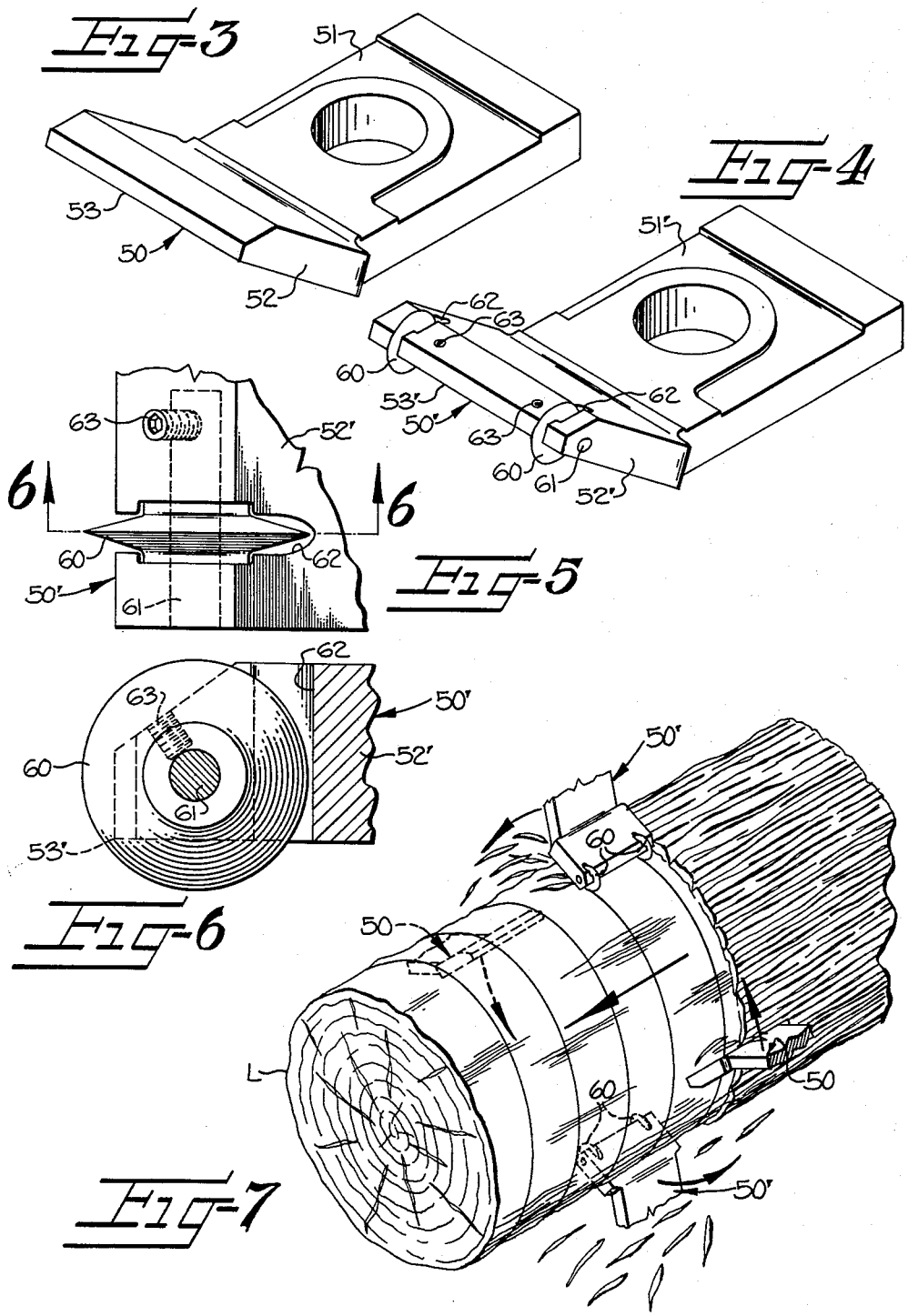

United States Patent Office 3,119,422
Patented Jan. 28, 1964

3,119,422
BARK REMOVING MACHINE
Jessie H. Brown, St. Stephen, S.C., assignor to Southern Coatings and Chemical Company, Sumter, S.C., a corporation of South Carolina
Filed July 18, 1961, Ser. No. 124,896
2 Claims. (Cl. 144—208)

The present invention relates to improvements in a machine for removing the bark from logs of the type which has a plurality of circularly arranged inwardly extending scraper blades which engage and strip the bark from the log as the blades travel a circular path around the log. In this type of machine, the scraper blades are carried in a rotating annular bark removing head and the inner ends of the blades are moved into pressure engagement with the periphery of the logs to strip the bark from the logs as they are fed longitudinally through the machine.

This type of bark removing machine may be efficiently utilized to remove the bark from certain types of logs, however, when the bark is stripped from other types of logs, such as cypress and elm, the scraper blades remove the bark in long longitudinal strips and these long strips become entangled in the rotating bark removing head. The entangled strips of bark cause a jam-up and the machine must be stopped while the operator removes the long strips of entangled bark by cutting the same with an axe or other manual means. This entails a loss of production of the machine and also the long strips of bark may cause damage to the various parts of the bark removing machine and to the conveyors that take the bark away.

With the foregoing in mind, it is a primary object of the present invention to provide an improved bark removing machine of the type described wherein selected ones of the bark scraper blades are provided with means for cutting the bark in a spiraled path as the log passes through the rotating bark removing head to thereby transversely cut any long strips of bark removed from the log by the scraper blades and to thereby cut the bark into small fragments which are easily discharged from the machine and which cannot become entangled in the operating parts of the machine.

It is a more specific object of the present invention to provide an improved bark removing machine of the type described in which the bark cutting means includes cutting wheels supported for rotation on the inner ends of certain of the scraper blades to transversely cut any bark being stripped from the log by the bark scraper blades.

Some of the objects of the invention having been stated, other objects will appear as the description proceeds, when taken in connection with the accompanying drawings, in which—

FIGURE 3 is an isometric view of one of the conventional scraper blades, removed from the machine;

FIGURE 4 is an isometric view of one of the improved scraper blades, removed from the machine, and showing the manner in which the cutter elements or wheels are supported for rotation on the inner end thereof;

FIGURE 5 is an enlarged fragmentary plan view of the right-hand corner of the inner end of the scraper blade shown in FIGURE 4, illustrating the configuration of one of the cutter wheels carried by the scraper blade;

FIGURE 6 is a vertical sectional view taken substantially along the line 6—6 in FIGURE 5;

FIGURE 7 is a schematic illustration of the manner in which the bark scraper blades and cutter wheels move around the longitudinally moving log and cooperate to remove the cut the bark in small fragments as it is removed from the logs.

There are several known types of bark removing machines which utilizes scraper blades to remove the bark from a log passed longitudinally through the machine and the present invention may be utilized to improve the operation of any of these known types of bark removing machines. Although the present invention is shown and described in connection with a bark removing machine of the type disclosed in United States Patent No. 2,802,495, issued to T. W. Nicholson, it is to be understood that the present invention may also be utilized to improve the operation of any bark removing machine of the type which includes means to feed logs longitudinally through a rotating ring element which is provided with inwardly projecting scraper blades that engage and scrape the bark from the logs. For example, bark removing machines of this general type are shown in United States Patents Nos. 2,815,776; 2,880,771; 2,899,994; and 2,908,302.

Figure 1:
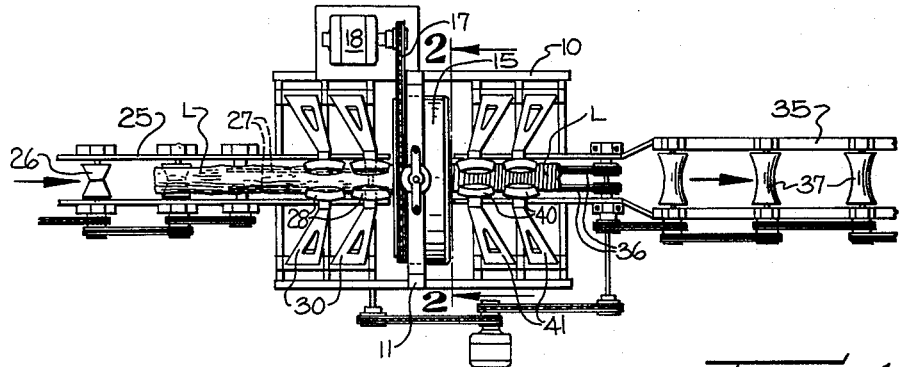
FIGURE 1 is a somewhat schematic plan view of the improved bark removing machine and showing a log being moved in a longitudinal path through the machine.

Referring particularly to FIGURE 1, the improved bark removing machine includes a main frame 10 having an inverted U-shaped auxiliary or bridging support frame 11 which is fixedly secured at its lower end on the central portion of the main frame 10. The vertical legs of the bridging support frame 11 support a carriage 12 (FIGURE 2) for vertical adjustment in a conventional manner. An annular bark removing head or ring 15 is rotatably supported in the carriage 12 (FIGURE 2) and rotation is imparted to the head 15 by sprocket chains 17 (FIGURE 1). The chains 17 are driven by a motor 18 which is suitably supported for vertical movement with the bark removing head supporting carriage 12.

The rotating bark removing head 15 (FIGURE 2) pivotally supports the outer ends of four radially spaced blade support arms 20. The arms 20 extend inwardly from the head 15 and their inner ends support bark scraper blades, to be later described. The inner ends of the arms 20 and their bark scraper blades may be moved inwardly and outwardly toward and away from the central axis of a log L (FIGURE 2) by conventional fluid pressure operated cylinders 22 which are supported on the head 15 and connected to the arms 20 in a conventional manner. The manner in which the bark removing head 15 is rotatably supported in the carriage 12 and the manner in which the fluid pressure lines are connected to operate the cylinders 22 is clearly shown and described in the T. W. Nicholson U.S. Patent No. 2,802,495 and, therefore, will not be shown and described in detail in the present application.

The main frame 10 supports one end of an inlet conveyor 25 (FIGURE 1) which includes driven log supporting and moving rolls 26 and a pair of log conveyor chains 27. Log hold-down wheels 28 engage the upper portion of the log L and are supported for rotation on the inner ends of lever arms 30 which are pivotally supported at their outer ends on the main frame 10. The arms 30 are urged downwardly by fluid pressure cylinders, not shown, so that the wheels 28 frictionally engage the upper surface of the log L to prevent rotation of the log as it moves in a longitudinal path through the annular rotating bark removing head 15 (FIGURE 1). The wheels 28 also urge the log L downwardly into firm engagement with the driven conveyor chains 27.

The bark removing machine is also provided with an outlet or discharge conveyor 35 which is supported at one end on the main frame 10. The discharge conveyor 35 is provided with a pair of driven conveyor chains 36 and driven conveying rollers 37 which carry the log L from the machine after it has passed through the annular rotating bark removing head 15. Log hold-down wheels 40 are provided at the discharge side of the machine and engage the upper surface of the log L to prevent rotation of the log while maintaining the log in firm pressure engagement with the conveyor chains 36. The wheels 40 are rotatably supported on the inner ends of lever arms 41 which are pivotally supported at their outer ends on the frame 10. Conventional fluid pressure cylinders, not shown, are attached to the arms 41 and exert downward pressure to cause the wheels 40 to engage the upper portions of the log L to hold the same down in firm engagement with the chains 36.

The log conveying means of the bark removing machine is conventional and is of substantially the type shown in the T. W. Nicholson U.S. Patent No. 2,821,220. However, it is to be understood that other suitable log conveying means may be employed to move the logs L in a longitudinal path through the rotating annular bark removing head 15.

During operation of the bark removing machine, logs L are successively fed onto the inlet conveyor 25 in any suitable manner. The driven rolls 26 advance the log L onto the chains 27 and as the log is passed beneath the hold-down wheels 28, it is advanced longitudinally through the bark removing head 15. The scraper blades attached to the inner ends of the arms 20 engage and scrape the bark from the log as it passes through the head 15 in non-rotating condition. As the leading end of the log L moves through the annular bark removing head 15, it is engaged by the chains 36 and the hold-down wheels 40 and moved onto the driven rollers 37. The logs may be removed from the discharge conveyor 35 in any suitable manner. As the scraper blades remove the bark from the log, the bark falls by gravity to the lower portion of the machine where it may be removed by a suitable conveyor.

Figure 2:
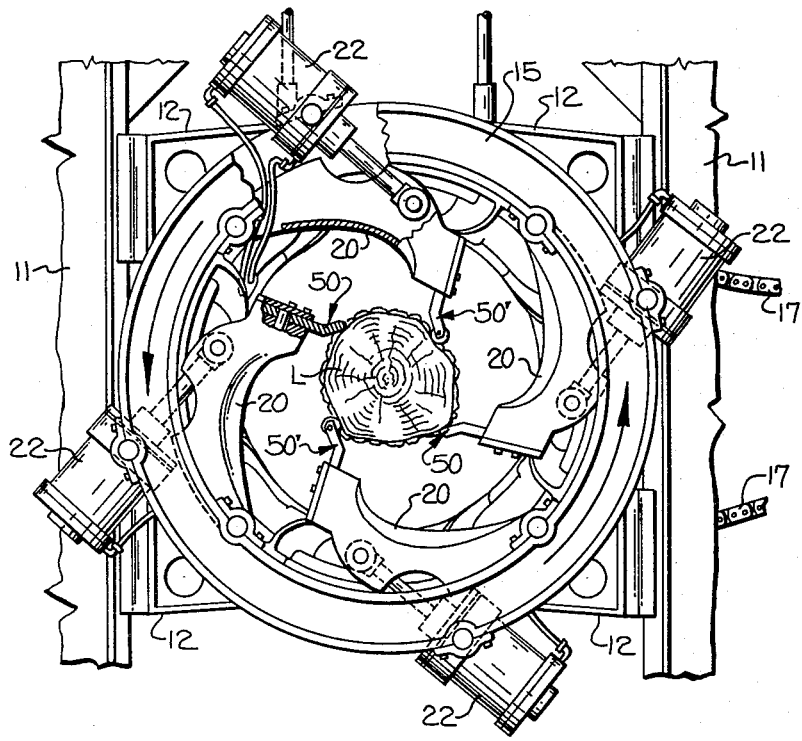
FIGURE 2 is an enlarged fragmentary vertical sectional view through the machine being taken substantially along the line 2—2 in FIGURE 1, and illustrating the manner in which the log is passed through the rotating annular bark removing head with the inner ends of the scraper blades being urged inwardly into pressure engagement with the periphery of the logs.

Referring to FIGURE 2, it will be noted that two of the opposed arms 20 have conventional bark scraper blades 50 attached to their inner ends in a conventional manner and the other two opposed arms 20 have improved bark scraper blades 50' attached to their inner ends. Referring to FIGURES 3 and 4, the conventional scraper blades 50 and the improved scraper blades 50' each include respective body portions 51 and 51' which are adapted to be suitably connected to the inner ends of the arms 20 in a conventional manner. The body portions 51 and 51' each have respective integrally formed bark scraping inner portions 52 and 52' which are provided with terminal bark scraping edges 53 and 53'. It will be noted that the bark scraping portions 52 and 52' extend outwardly from the respective body portions 51 and 51' at an obtuse angle. However, it is to be understood that other types of bark scraping blades may also be improved in accordance with the present invention.

Referring to FIGURE 4, it will be noted that the scraper blade 50' is provided with a pair of identical cutting wheels or disks 60 which are rotatably supported in the inner bark scraping portion 52'. The peripheral edges of the wheels 60 extend outwardly beyond the terminal edge 53' (FIGURES 5 and 6). The bark cutting wheels 60 are preferably mounted adjacent opposite sides of the scraper blade 50; and in an identical manner, therefore, the mounting of only one of the wheels 60 will be described and shown in detail.

The bark cutting wheel 60 has a sharpened peripheral edge and is mounted for rotation on a stub shaft 61. The shaft 61 extends through a slot 62 which is cut in the outer end of the bark scraping portion 52' of the bark scraping blade 50'. The outer end of the shaft 61 is flush with one side of the scraper blade 50' and its inner end is suitably secured in the scraper blade 50' by a set screw 63 (FIGURES 5 and 6) which is threadably embedded in the outer portion of the scraper blades 50'. Should the outer periphery of the cutting wheels 60 become dull, they may be easily replaced by loosening the set screw 63 to remove the shaft 61.

As shown schematically in FIGURE 7, as the log L is moved in a longitudinal path through the annular rotating bark removing head 15 by the conveying means, the inner ends of the bark scraper blades 50 are rotated around and engage the bark to remove the same from the log while the cutter wheels 60 on the inner ends of the bark scraper blades 50' cut the bark transversely to prevent the bark from being stripped from the log in long longitudinal strips. Thus, the cutter wheels 60 cut the bark into small fragments which easily drop by gravity below the bark removing machine where they may be easily removed by any suitable means, not shown. Thus, the bark scraping blades 50' perform two functions; i.e., that of scraping or stripping the bark from the logs as they rotate thereabout and that of transversely cutting the bark being removed or stripped from the log.

Although it is preferred that a wheel 60 be provided adjacent each side of the two opposed scraper blades 50', it is to be understood that a single cutter wheel 60 may be provided in the center of the blade or adjacent either side. Also, other types of cutting means may be provided on the blades in place of the rotatable cutting wheel 60 to transversely cut the bark as it is removed from the log.

Thus, in the improved machine of the present invention, the cutting wheels 60 are carried by certain of the bark scraping blades and act to cut the bark transversely as it is removed from the logs so that the removed bark is cut into small fragments which are easily discharged from the machine without the danger of becoming entangled in the parts of the annular rotating bark removing head 15.

In the drawings and specification there has been set forth a preferred embodiment of the invention and, although specific terms are employed, they are used in a generic and descriptive sense only and not for purposes of limitation, the scope of the invention being defined in the claims.

I claim:

1. An improved machine for removing the bark from logs comprising a frame, an annular bark removing head supported on said frame, conveyor means operable to support and advance a log longitudinally through said bark removing head while preventing rotation of the log about its longitudinal axis, means to impart rotation to said head, a plurality of bark scraper blades mounted on said head and extending inwardly in circumferentially spaced relationship to engage the periphery of a log passed through said head, means carried by said rotating head to urge the inner end of said scraper blades into engagement with the log and strip the bark therefrom, the combination therewith of bark cutting means carried by certain of said bark scraper blades and positioned to cut the bark in a spiraled path as the log passes through said rotating bark removing head to transversely cut any strips of bark removed by said blades, said cutting means comprising at least one cutter wheel mounted for rotation on the inner end of said certain scraper blade, said certain blade having a slot extending inwardly from the inner edge thereof, a shaft carried by said certain bark scraper blade and extending transversely through the slot and supporting said cutter wheel thereon, and the peripheral cutting edge of said cutting wheel extending outwardly above, below and beyond the bark scraping edge of said certain blade.

2. An improved bark scraper blade adapted to be used in a machine of the type described for removing bark from logs, said blade being elongate and comprising a body portion and an integrally formed bark scraper portion extending outwardly from said body portion at an obtuse angle, said scraper portion having an elongate scraper edge at its terminal end remote from said body portion, and a rotatable cutter wheel mounted in said scraper portion, said cutter wheel having a sharpened peripheral edge extending transversely of said elongate scraper edge and extending outwardly above, below and beyond said elongate scraper edge.

References Cited in the file of this patent

UNITED STATES PATENTS

| | | |
|---|---|---|
| 1,900,702 | Fisher | Mar. 7, 1933 |
| 2,655,763 | Grissett | Oct. 20, 1953 |
| 2,688,349 | Nicholson | Sept. 7, 1954 |
| 2,802,495 | Nicholson | Aug. 13, 1957 |
| 3,026,919 | Lunn | Mar. 27, 1962 |

FOREIGN PATENTS

| | | |
|---|---|---|
| 182,522 | Austria | July 11, 1955 |
| 27,571 | Finland | Aug. 15, 1955 |
| 154,715 | Sweden | June 5, 1956 |
| 543,522 | Canada | July 16, 1957 |
| 621,075 | Canada | May 30, 1961 |